Sept. 24, 1957 C. W. GORDON 2,807,450
APPARATUS AND METHOD OF SCRUBBING GASES
Filed Feb. 25, 1955
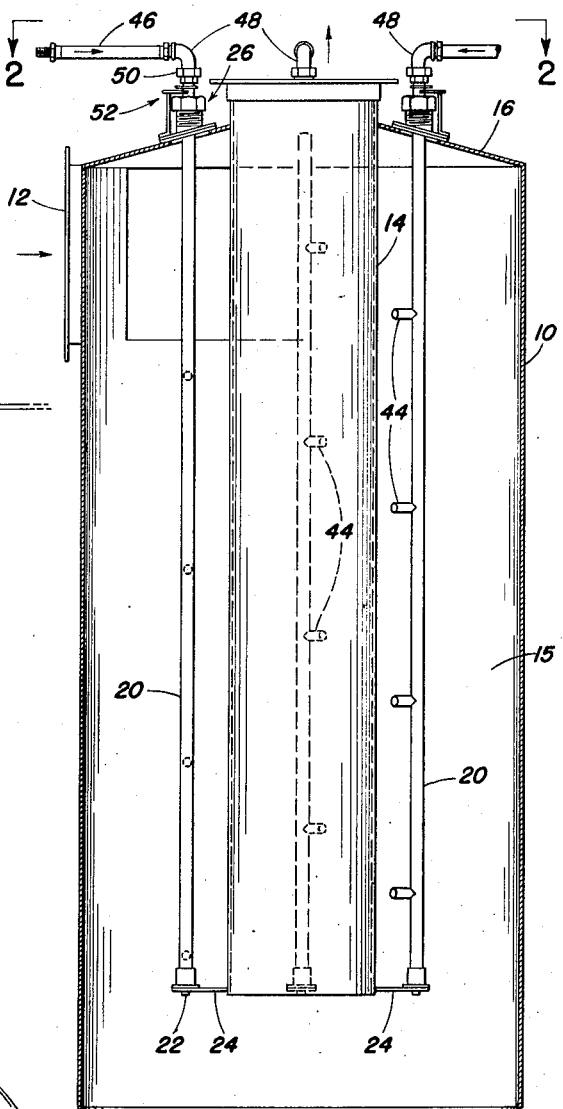
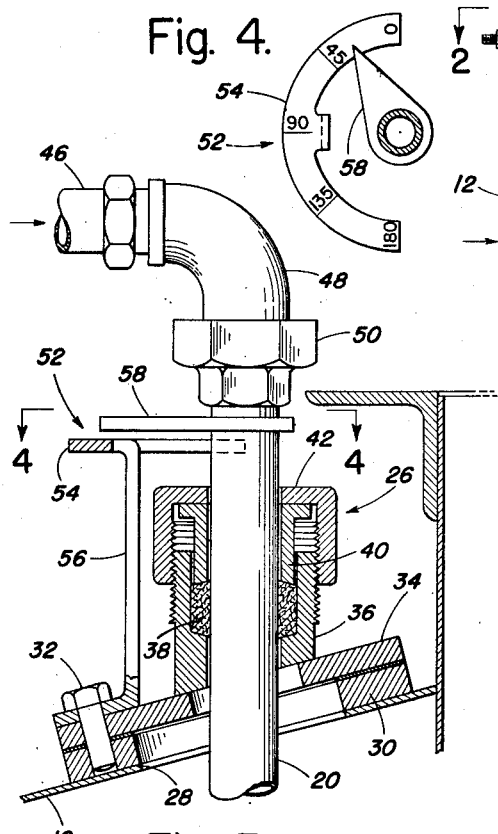
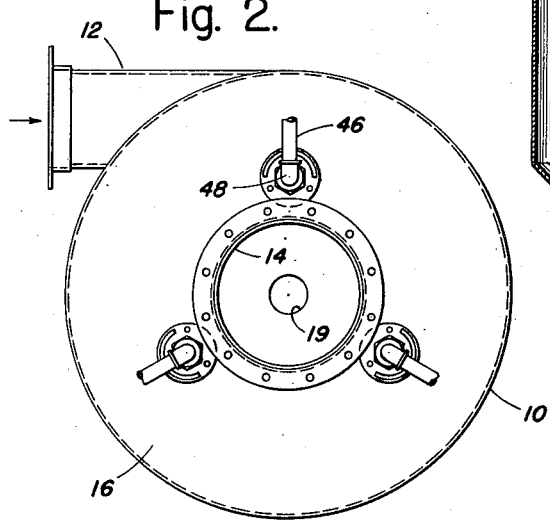
INVENTOR
Charles W. Gordon
BY
Elden H. Luther
ATTORNEY

United States Patent Office 2,807,450
Patented Sept. 24, 1957

2,807,450

APPARATUS AND METHOD OF SCRUBBING GASES

Charles W. Gordon, Glen Ellyn, Ill., assignor to Combustion Engineering, Inc., New York, N. Y., a corporation of Delaware Application February 25, 1955, Serial No. 490,574

9 Claims. (Cl. 261—79)

The present invention relates to an apparatus and method for removing from a stream of gas finely divided matter that is suspended therein.

In separating fine particles from a gaseous stream by means of injecting an atomized spray of liquid thereinto with the stream of gas being directed in a helical or spiral path, the deposition that is effected is a result of both deposition by impaction, i. e., impact of the particles upon the liquid droplets, and deposition by diffusion, i. e., diffusion of the particles up to the surface of the liquid droplets due to the Brownian movement, with the effectiveness of the former decreasing and the latter increasing as the particle size decreases so that with submicron sized particles deposition by diffusion may exceed that by impaction. In order to have deposition by impaction the droplets must have motion relation to the particles and with the arrangement hereinbefore mentioned this is obtained by the lateral movement of the droplets across the gas stream resulting from the centrifugal force developed when the droplets become entrained in the whirling gas stream with accelerations of one hundred times that of gravity being developed. As to deposition by diffusion, however, the droplets may and preferably do move along with the gas stream and not across the stream with the Brownian movement of the particles bringing them into contact with the surface of the droplets.

Since the atomized liquid spray contains droplets that vary in size over a wide range the larger of these droplets with the greater mass will have the greater acceleration across the gas stream and accordingly will effect the greatest deposition by impaction while the small particles will tend to move along with the gas stream and not travel thereacross and accordingly will effect the greatest deposition by diffusion. Thus, if the direction at which the sprays were projected into the whirling gas stream were variable relative to the direction of movement of the gas stream the velocity of the gas stream and the percentage of the spray volume that is primarily effective for deposition by impaction and for deposition by diffusion may be controlled, within limits, so that the maximum or optimum operating efficiency may be had for the particular material laden gas being treated with the greater the percentage of submicron particles entrained in the gas the greater the desired deposition by diffusion.

It is an object of the present invention to provide an improved gas treating method and apparatus providing such adjustment.

It is a further object of this invention to provide such an improved gas treating apparatus that is simple and economical in construction yet highly reliable in operation.

Other and further objects of the invention will become apparent to those skilled in the art as the description proceeds.

With the aforementioned objects in view, the invention comprises an arrangement, construction and combination of the elements of the inventive organization in such a manner as to attain the results desired as hereinafter more particularly set forth in the following detailed description of an illustrative embodiment, said embodiment being shown by the accompanying drawing wherein:

Fig. 1 is a vertical sectional view of the separator or scrubber of the present invention showing the longitudinal disposition of the liquid distribution conduits within the housing.

Fig. 2 is a plan view of the scrubber taken from line 2—2 of Fig. 1.

Fig. 3 is a detailed sectional view of the fluid tight juncture between the liquid distribution conduits and the top of the cylindrical housing.

Fig. 4 is a detailed sectional view taken along line 4—4 of Fig. 3 and showing the indicator which forms a part of the invention.

Referring now to the drawings, wherein like reference characters are used throughout to designate like elements, the scrubber type separator of the present invention comprises a cylindrical shell or housing 10 having a tangentially disposed inlet 12 at its upper end for the admission of a dust laden gas stream and an outlet 19 in its conical bottom 18 for the removal of the particulate matter that is separated from the gas during its passage through the housing. The gas, after the particulate matter has been removed therefrom, enters the lower end of outlet duct 14 and passes upwardly therethrough out of housing 10 with this duct being coaxial of the housing and extending downwardly thereinto through a suitable opening provided in the top or roof plate 16 and terminating a substantial distance from the conical bottom portion 18 in order to provide for unobstructed passage of the gas stream into the lower end of the duct.

Extending downwardly through roof plate 16 and in parallel relation with the axis of housing 10 are the fluid distribution conduits or headers 20 which are preferably symmetrically disposed about duct 14 and adjacent the outer surface of this duct. These conduits are mounted in housing 10 in such a manner that they may be rotatably adjusted about their axes and for this purpose the inner end of each of the conduits, which is plugged by pipe plug 22, is journalled to support bracket 24 extending radially outward form the lower end of duct 14 while the upper end of each conduit passes through roof plate 16 with the stuffing box 26 being effective to prevent fluid leakage from the interior of housing 10 along the conduit while permitting rotational movement of the conduit. As is evidenced from Fig. 3 this stuffing box is secured to roof plate 16 outwardly of opening 28 provided in the roof plate and includes the annular body member 30 to which plate member 34 is attached by means of cap screws 32 with sleeve 36 being welded to this plate member and extending vertically upward therefrom. This sleeve 36 is provided with a counterbore within which is positioned the packing 38 which is axially compressed by gland 40 and nut 42 so as to cause the packing to expand radially into fluid tight engagement with the conduit 20.

At spaced intervals along with length of each of the conduits are provided the atomizing spray nozzles 44 with the axis of the nozzles associated with each conduit being preferably radial with respect to the conduit and lying in a common plane so that the spray from each nozzle of a single conduit will be in the same direction. The nozzles of the various conduits 20 are preferably vertically offset from those in adjacent conduits in order that the distribution of the sprays will be more uniform with respect to the gas stream.

A suitable liquid, which may be water or any other desired liquid for washing the dust laden gas that enters housing 10 through the tangentially arranged inlet 12, is supplied to each of the conduits 20 through a suitable supply system, not here shown, which connects with the flexible hose 46 which in turn is connected with the 90° elbow union 48 threaded to the upper end of each of the conduits and which includes the nut member 50. With this organization rotation of conduits 20 about their axes may be had merely by loosening nut 50 and rotating the conduit to the desired position and thereafter tightening the nut. However, any other suitable means that will provide this rotation of conduits 20 may be employed if desired.

In order that the particular disposition of nozzles 44 with respect to the direction of the gas flow past these nozzles may be known indicator 52 is provided at the upper end of each of the conduits 20. This indicator includes an arcuate scale 54 and pointer 58 with the arcuate scale being mounted on roof plate 16 by means of arm 56 and set screw 32 and with pointer 58 being mounted on conduit 20 by welding or otherwise and extending in the same direction as nozzles 44 with its tip overlying this arcuate scale. Suitable indicia are provided on scale 54 to provide an indication of the angle of the nozzles and accordingly the direction of the spray emanating from the nozzles with respect to the direction of the gas flow thereby clearly indicating the direction at which this spray is projected into the gas stream with the 0 indicia indicating uniflow and the 180 indicia indicating counterflow.

In operation, a stream of dust laden gas enters housing 10 through inlet 12 and travels in a spiral path downwardly through the annular space 15 between duct 14 and housing 10. Upon reaching the lower end of duct 14 the gas stream enters this duct and passes upwardly therethrough out of the housing 10 and to a desired point through suitable duct work connected to the upper end of this duct 14. Each of the conduits 20 is supplied with a high pressure washing liquid so that an atomized spray issues from each of the nozzles 44 directly into the spiraling gas stream. The rotative position of each of the conduits 20 is adjusted so as to give the optimum operating efficiency with the particular gas or gas-dust mixture that is passing through the scrubber with this adjustment being effected by loosening nut 50 of union 48 sufficiently to permit rotation of the conduit and their retightening of this nut after the conduit has been rotated to its desired position thereby securing the conduit in this desired rotative position.

Since each of the conduits may be rotated to and from extreme positions where the issuing sprays from atomizing nozzles 44 are in the same direction as the spiraling gas stream and in the opposite direction of the spiraling gas stream, an excellent adjustment for gas streams containing different ranges of particle size may be had with an infinite number of adjustive positions being provided. As mentioned hereinbefore, as the particle size of the material entrained in the gas decreases the effectiveness of deposition by diffusion increases and since deposition by diffusion occurs primarily when the liquid droplets and particles are moving along together in the gas stream as contrasted with deposition by impaction which is dependent upon relative movement between the droplets and particles the overall efficiency of separation will be increased by progressively rotating conduits 20 (in the counterclockwise direction as viewed in Fig. 2) from the extreme position where the spray from nozzles 44 is in the direction of the whirling gas stream toward the other extreme position where the spray is in the opposite direction of the whirling gas stream as the percentage of submicron size particles increases and by adjusting the relative angle of spray injection in this manner the optimum separating efficiency may be had for gas streams having varying particle size make up. This is due to the fact that as these conduits are so rotated and the direction of the spray changed from uniflow toward counterflow the velocity of the gas stream through duct 10 will be progressively decreased thereby decreasing the centrifugal force acting upon the water droplets so that a greater percentage of the droplets will effect deposition by diffusion rather than deposition by impaction. Furthermore by spraying the liquid in the counterflow direction with relation to the gas flow the water droplets will have to change direction completely before being subjected to any centrifugal force whatsoever and this will also tend to increase the deposition by diffusion.

By means of the indicator the position of conduits 20 may be preset for a particular gas and dust mixture which it is known will be employed with a particular unit or at a particular time. To preset the conduits in this manner it is merely necessary to calibrate the indicating device with various gas-dust mixtures that may be encountered so that the correct position of these conduits which will result in the optimum operating efficiency of the unit for each such mixture may be determined, and thereafter the unit may be preset for any of these particular mixtures.

The dust particles that are deposited on the water droplets of the atomized spray projected into the gas stream are separated from the gas stream and fall to the bottom of housing 10 passing out through opening 19 provided therein to a suitable collecting bin or the like.

It is essential that nozzles 44 be of the atomizing spray type since while a non-atomizing spray may be effective to collect large particulate material it is totally ineffective to collect micron and submicron size material with which the present invention is concerned.

While I have illustrated and described a preferred embodiment of my novel organization it is to be understood that such is merely illustrative and not restrictive and that variations and modifications may be made therein without departing from the spirit and scope of the invention. I therefore do not wish to be limited to the precise details set forth but desire to avail myself of such changes as fall within the purview of my invention.

What I claim is:

1. In an organization of the type described an upright cylindrical vessel having a tangentially disposed inlet adjacent one end thereof for admission of gas containing particulate matter thereinto tangentially of the inner surface thereof and an outlet adjacent its other end for conveying said gas from said vessel after a substantial portion of the particulate matter has been removed therefrom, said vessel also having an outlet at the bottom thereof for discharge of the separated particulate matter from the vessel, a conduit extending into said vessel in generally parallel relation to the axis of the vessel but laterally offset from said axis and throughout a substantial portion of the length of said vessel, said conduit being mounted for rotational adjustment about its axis and being provided with a row of generally radially directed liquid atomizers disposed in a common plane and spaced along the length of said conduit for projection of an atomized liquid spray into the whirling gas stream passing through the vessel from the inlet to the outlet thereof and means for releasably retaining said conduit in desired adjusted rotative positions.

2. The organization of claim 1 including indicator means attached to said conduit outwardly of said vessel and effective to indicate the rotational position of said atomizers with respect to the direction of gas flow past said atomizers.

3. A separator for separating particulate matter from a gas stream comprising a vertically disposed cylindrical housing having a tangentially disposed inlet adjacent its upper end, a cylindrical outlet duct coaxial with said housing and extending thereinto through an opening in the upper end thereof with the lower end of said duct spaced from the lower end of said housing, said housing having an opening in the bottom thereof for the removal of particulate matter, a liquid distribution conduit extending into the annular space between said duct and housing with one end disposed outwardly of said housing and adapted to be connected to a source of liquid supply, said conduit being generally parallel to the axis of said housing and extending substantially throughout the length of said duct and being mounted within said housing in a manner permitting rotational adjustment thereof about its axis, said conduit having a row of generally radially directed liquid atomizers disposed in a common plane and spaced along the length of said conduit for projection of a liquid spray into the whirling gas stream and means for releasably retaining said conduit in desired adjusted rotative positions.

4. The organization of claim 3 including indicator means attached to said conduit outwardly of said housing and effective to indicate the rotational position of said atomizers with respect to the direction of gas flow past said atomizers.

5. The method of obtaining optimum efficiency of separation of a mixture of micron and submicron sized particulate matter from a gaseous stream within which they are entrained wherein said gaseous stream has a whirling motion imparted thereto and wherein there is injected directly into said whirling gas stream an atomized spray of liquid, comprising adjusting the angle of projection of said spray into said gas stream relative to the direction of movement of said stream at said point of injection by moving said spray from the position where spray is uniflow with respect to said gas stream toward the position where said spray is counterflow as the relative percentage of submicron matter increases to obtain the optimum efficiency of separation for the particular relative amounts of micron and submicron sized particles in the particular gas stream.

6. The method of scrubbing a gas stream with liquid to remove particulate matter from said stream comprising imparting a rotational whirling motion to such a gas stream which has particulate matter suspended therein with the particulate matter including both micron and submicron sized particles, injecting an atomized liquid spray into said whirling gas stream in a direction generally within the plane of the direction of movement of the gas stream at this point of injection, progressively adjusting, within said plane, the angle of projection of said spray into said gas stream as the percentage of submicron particulate matter increases relative to the micron size particulate matter from the position where said spray is uniflow with respect to said gas stream toward the position where said spray is counterflow with respect to said gas stream.

7. In a separator for separating particulate matter from a gas stream the combination of a vertically disposed cylindrical housing having a tangentially disposed inlet adjacent its upper end, a cylindrical duct coaxial with said housing and extending thereinto through an opening in the upper end thereof with the lower end of said duct spaced from the lower end of said housing, said housing having an opening in the bottom thereof for the removal of particulate matter, a plurality of liquid distribution conduits extending through the top of the housing downwardly into the annular space between said duct and housing throughout substantially the length of said duct and in generally parallel relation to the axis of said housing, said conduits being symmetrically disposed about said duct and adjacent thereto and mounted so as to permit rotational adjustment about their axes with the inner end of the conduits being journaled in support members extending radially outward of said duct and the outer end adapted to be connected to a source of liquid supply, each of said conduits having a row of generally radially directed liquid atomizers disposed in a common plane and spaced along the length of the conduit for projection of a liquid spray into the whirling gas stream and means for releasably retaining said conduit in desired adjusted rotative positions.

8. The organization of claim 7 including indicator means associated with each of said conduits outwardly of said housing and effective to indicate the rotational position of said atomizers with respect to the direction of gas flow past said atomizers.

9. The organization of claim 7 wherein the atomizers of adjacent conduits are located in different horizontal planes.

References Cited in the file of this patent

UNITED STATES PATENTS

| | | |
|---|---|---|
| 1,453,494 | Dennon | May 1, 1923 |
| 1,895,652 | Fisher | Jan. 31, 1933 |
| 2,687,780 | Culhane | Aug. 31, 1954 |
| 2,694,042 | Tapleshay et al. | Nov. 9, 1954 |